(12) United States Patent
Lee et al.

(10) Patent No.: US 10,818,944 B2
(45) Date of Patent: Oct. 27, 2020

(54) HEAT EXCHANGE DEVICE FOR COOLING WATER OF FUEL CELL AND FUEL CELL SYSTEM COMPRISING THE SAME

(71) Applicants: HYUNDAI MOTOR COMPANY, Seoul (KR); KIA MOTORS CORPORATION, Seoul (KR)

(72) Inventors: Nam Woo Lee, Hwaseong-si (KR); Hyuck Roul Kwon, Yongin-si (KR); Sung Wook Na, Yongin-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 135 days.

(21) Appl. No.: 15/798,027

(22) Filed: Oct. 30, 2017

(65) Prior Publication Data
US 2018/0175420 A1   Jun. 21, 2018

(30) Foreign Application Priority Data

Dec. 15, 2016   (KR) .......................... 10-2016-0171968

(51) Int. Cl.
*H01M 8/04701* (2016.01)
*H01M 8/04014* (2016.01)
(Continued)

(52) U.S. Cl.
CPC ........ *H01M 8/04723* (2013.01); *F28D 20/02* (2013.01); *F28D 20/021* (2013.01);
(Continued)

(58) Field of Classification Search
CPC combination set(s) only.
See application file for complete search history.

(56) References Cited

U.S. PATENT DOCUMENTS 4,127,161 A * 11/1978 Clyne ..................... F28D 20/02
126/400
4,193,441 A * 3/1980 Scaringe .................. F24H 1/18
165/276

(Continued)

FOREIGN PATENT DOCUMENTS

DE   102011083145 A1   3/2013
JP    61-173085 A        8/1986
(Continued)

OTHER PUBLICATIONS

Functional Microcapsules, Microcapsule_brochure, http://www.insilico.co.kir/doc/brochure/microcapsule_brochure_eng_pdf.
(Continued)

*Primary Examiner* — Michael L Dignan
(74) *Attorney, Agent, or Firm* — Morgan, Lewis & Bockius LLP (57) ABSTRACT

Disclosed is a heat exchange apparatus for cooling water of a fuel cell, the heat exchange apparatus including a body, through which a cooling water pipe, through which cooling water that is to be supplied to a fuel cell stack flows, passes, and a heat accumulator provided in the interior of the body and filled with a PCM heat accumulation material that is to exchange heat with the cooling water. The body includes a medium space provided between the cooling water pipe and the heat accumulator and filled with a medium material. The PCM heat accumulation material exchanges heat with the cooling water by the medium material.

13 Claims, 5 Drawing Sheets

(51) Int. Cl.
*H01M 8/04492* (2016.01)
*H01M 8/04029* (2016.01)
*H01M 8/04007* (2016.01)
*F28D 20/02* (2006.01)

(52) U.S. Cl.
CPC ....... *H01M 8/045* (2013.01); *H01M 8/04014* (2013.01); *H01M 8/04029* (2013.01); *H01M 8/04067* (2013.01); *H01M 8/04507* (2013.01); *H01M 8/04529* (2013.01)

(56) References Cited

U.S. PATENT DOCUMENTS

| | | | | |
|---|---|---|---|---|
| 5,239,839 | A * | 8/1993 | James | F25D 3/005 126/400 |
| 5,524,453 | A * | 6/1996 | James | F24F 5/0017 62/434 |
| 5,680,898 | A * | 10/1997 | Rafalovich | F24F 5/0017 165/236 |
| 5,687,706 | A * | 11/1997 | Goswami | F24H 7/0433 126/263.01 |
| 7,147,071 | B2 * | 12/2006 | Gering | B60H 1/00278 237/12.3 B |
| 7,735,461 | B2 | 6/2010 | Vetrovec | |
| 2003/0138688 | A1 * | 7/2003 | Hattori | H01M 8/04029 429/425 |
| 2009/0260781 | A1 * | 10/2009 | Ullman | F28D 20/023 165/104.21 |
| 2011/0197603 | A1 * | 8/2011 | Brown | F25B 39/02 62/117 |
| 2012/0138275 | A1 | 6/2012 | Biggin et al. | |
| 2012/0168111 | A1 * | 7/2012 | Soukhojak | F28D 20/023 165/10 |
| 2012/0241120 | A1 * | 9/2012 | Hagel | B60H 1/00492 165/10 |
| 2012/0241122 | A1 * | 9/2012 | Xiang | C09K 5/063 165/10 |
| 2013/0146000 | A1 | 6/2013 | Choi et al. | |
| 2014/0305609 | A1 | 10/2014 | Guillaume et al. | |
| 2016/0201995 | A1 * | 7/2016 | Oliva Llena | F28D 20/0056 165/10 |
| 2018/0175420 | A1 | 6/2018 | Lee et al. | |

FOREIGN PATENT DOCUMENTS

| | | |
|---|---|---|
| JP | H10-0246584 A | 9/1998 |
| JP | 2001-317887 A | 11/2001 |
| JP | 2008-019555 A | 1/2008 |
| JP | 2009-275518 A | 11/2009 |
| JP | 2009-298190 A | 12/2009 |
| JP | 2010-127121 A | 6/2010 |
| JP | 2011-075192 A | 4/2011 |
| JP | 4844797 B2 | 12/2011 |
| JP | 2013-181692 A | 9/2013 |
| JP | 2014-178100 A | 9/2014 |
| KR | 10-2003-0041891 A | 5/2003 |
| KR | 20-0351509 Y1 | 5/2004 |
| KR | 10-1102333 B1 | 1/2012 |
| KR | 2012-0045001 A | 5/2012 |
| KR | 10-1157860 B1 | 6/2012 |
| KR | 10-2013-0041407 A | 4/2013 |
| KR | 10-1305199 B1 | 9/2013 |
| KR | 10-2013-0116247 A | 10/2013 |
| KR | 10-1318620 B1 | 10/2013 |
| KR | 10-1426284 B1 | 8/2014 |
| KR | 10-2015-0024624 A | 3/2015 |
| KR | 10-2018-0068659 A | 6/2018 |
| KR | 10-2018-0069618 A | 6/2018 |

OTHER PUBLICATIONS

U.S. Office Action dated Oct. 25, 2019 issued in U.S. Appl. No. 15/802,203.

* cited by examiner

HEAT EXCHANGE DEVICE FOR COOLING WATER OF FUEL CELL AND FUEL CELL SYSTEM COMPRISING THE SAME

CROSS-REFERENCE TO RELATED APPLICATION

This application is based on and claims the benefit of priority to Korean Patent Application No. 10-2016-0171968, filed on Dec. 15, 2016, in the Korean Intellectual Property Office, the disclosure of which is incorporated herein in its entirety by reference.

TECHNICAL FIELD

The present disclosure relates to a heat exchange apparatus for cooling water of a fuel cell and a fuel cell system including the same.

BACKGROUND

A fuel cell is an apparatus that converts chemical energy stored in hydrocarbon or a hydrogen fuel to electrical energy through an electrochemical reaction with air. A polymer electrolyte fuel cell (PEFC) used in vehicles or the like is a fuel cell that uses a polymer as an electrolyte, and is operated at a temperature of not more than 100° C. Hydrogen ions produced by an anode of the fuel cell stack flow to a cathode through an electrolyte, and generate electricity while reacting with oxygen in the cathode to generate water.

However, a process of generating electricity in the fuel cell is a heat emitting reaction, and the temperature of the fuel cell stack may exceed 100° C. depending on the operation of the fuel cell. Accordingly, it is necessary to supply cooling water into the fuel cell stack to maintain the temperature of the fuel cell stack at not more than 100° C.

Then, in order to adjust the temperature of the cooling water, heat may be emitted or supplied to the cooling water supplied to the fuel cell stack and passing through a heat exchanger, and a PCM heat accumulation material may be used in the heat exchanger. The PCM is a material, a phase of which is changed depending on temperature.

Because the PCM absorbs or emits a large amount of thermal energy when the phase of the PCM is changed, it may be used to absorb or emit heat in the fuel cell system. That is, the PCM is used as a heat accumulation material to supply heat accumulated in the PCM heat accumulation material or accumulate the heat of the cooling water in the PCM heat accumulation material.

However, the phase change temperatures of the PCMs are determined in advance and cannot be changed. Accordingly, even though the user found a PCM having suitable phase change energy, it is difficult to use the PCM if the phase change temperature of the PCM does not satisfy a required condition.

Further, the temperature of the cooling water supplied to the fuel cell stack during an operation of the fuel cell system has to be changed depending on situations. However, in the conventional heat exchanger, because the heat transfer rates of the PCM heat accumulation material and the cooling water cannot be changed, the temperature of the cooling water supplied to the fuel cell stack cannot be adjusted depending on situations.

SUMMARY

The present disclosure provides a heat exchange apparatus that may employ a PCM, a phase of which is changed, as a heat accumulation material.

The present disclosure also provides a heat exchange apparatus that may easily adjust the temperature of cooling water supplied to a fuel cell stack by using a PCM, a phase of which is changed at a desired temperature, as a heat accumulation material.

The technical objects of the present disclosure are not limited to the above-mentioned one, and the other unmentioned technical objects will become apparent to those skilled in the art from the following description.

In accordance with an aspect of the present disclosure, there is provided a heat exchange apparatus for cooling water of a fuel cell, the heat exchange apparatus including a body, through which a cooling water pipe, through which cooling water that is to be supplied to a fuel cell stack flows, passes, and a heat accumulator provided in the interior of the body and filled with a PCM heat accumulation material that is to exchange heat with the cooling water, and the body includes a medium space provided between the cooling water pipe and the heat accumulator and filled with a medium material, and the PCM heat accumulation material exchanges heat with the cooling water by the medium material.

In another example, a material, a phase of which is changed at an operation temperature that is lower than a reference temperature due to the filling of the medium material, may be employed as the PCM heat accumulation material, and the reference temperature may be a phase change temperature that is required by the PCM heat accumulation material when a medium material is not provided between the heat accumulator and the cooling water pipe as the heat accumulator is located to contact the cooling water pipe.

In another example, the choice of medium material may be determined based on a heat transfer rate between the heat accumulator and the cooling water pipe such that a phase of the PCM accumulation material is changed at the operation temperature.

In another example, the heat exchange apparatus may further include a replacement unit configured to discharge a second medium material filled in the medium space from the medium space and supply a first medium material to the medium space, from which the second medium material has been discharged, to adjust a heat transfer rate between the heat accumulator and the cooling water pipe.

In another example, the replacement unit may include a first storage tank configured to store the first medium material, a first supply pipe provided separately from the cooling water pipe and configured to supply the first medium material from the first storage tank to the medium space, and a first recovery pipe configured to recover the first medium material discharged from the medium space to the first storage tank.

In another example, the replacement unit may discharge the second medium material, which is air, from the medium space by supplying the first medium material.

In another example, the replacement unit may further include a circulation pipe configured to circulate the first medium material discharged from the medium space to the first supply pipe, and the first medium material continues to be supplied through the first supply pipe and be circulated through the circulation pipe until at least the second medium material is completely discharged, and the second medium material may be discharged to the outside while flowing through the circulation pipe or the first supply pipe, together with the first medium material.

In another example, the replacement unit may further include a ventilation pipe configured to communicate the medium space and the outside of the body, and air outside the body is introduced into the medium space through the ventilation pipe due to a change of a pressure in the medium space, which occurs when the first medium material is recovered from the medium space to the first storage tank through the first recovery pipe.

In another example, the replacement unit may further include a second storage tank configured to store the second medium material, a second supply pipe provided separately from the cooling water pipe and configured to supply the second medium material from the second storage tank to the medium space, and a second recovery pipe configured to recover the second medium material discharged from the medium space to the second storage tank.

In another example, the replacement unit may supply the first medium material to the medium space through the first supply pipe after recovering the second medium material from the medium space to the second storage tank through the second recovery pipe.

In accordance with another aspect of the present invention, there is provided a fuel cell system including a fuel cell stack including a fuel electrode and an air electrode, a cooling water pipe configured to supply cooling water to the fuel cell stack, and a heat exchanger configured such that heat of the cooling water supplied to the fuel cell stack is exchanged in the interior thereof, and the heat exchanger may include a body, through which the cooling water pipe passes, and a heat accumulator provided in the interior of the body and filled with a PCM heat accumulation material that is to exchange heat with the cooling water, and the body includes a medium space provided between the cooling water pipe and the heat accumulator and filled with a medium material, and the PCM heat accumulation material exchanges heat with the cooling water by the medium material.

In another example, a material, a phase of which is changed at an operation temperature, which is lower than a reference temperature that is a phase change temperature that is required by the PCM heat accumulation material when a medium material is not provided between the heat accumulator and the cooling water pipe as the heat accumulator is located to contact the cooling water pipe, due to the filling of the medium material may be employed as the PCM heat accumulation material.

In another example, the fuel cell system may further include a replacement unit configured to discharge a second medium material filled in the medium space from the medium space and supply the first medium material to the medium space, from which the second medium material has been discharged, and a control unit configured to control the replacement unit to adjust a heat transfer rate between the heat accumulator and the cooling water pipe.

In another example, the control unit may adjust the temperature of the cooling water discharged from the heat exchanger through adjustment of the heat transfer rate by the control of the replacement unit.

In another example, the control unit may control the replacement unit, based on a moisture situation in the fuel cell stack.

In another example, the control unit may control the replacement unit such that, among the first and second medium materials, a medium material having a high thermal conductivity is filled in the medium space if the moisture situation is determined to be a low moisture situation, and, among the first and second medium materials, a medium material having a low thermal conductivity is filled in the medium space if the moisture situation is determined to be a high moisture situation.

In another example, the control unit may adjust a period of time, for which the PCM accumulation material in a liquid state is coagulated, through adjustment of the heat transfer rate by the control of the replacement unit.

In another example, the replacement unit may include a storage tank configured to receive a portion of cooling water for cooling the fuel cell stack and separately store the received cooling water so that the cooling water is used as the first medium material.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Hereinafter, exemplary embodiments of the present disclosure will be described in detail with reference to the accompanying drawings. Throughout the specification, it is noted that the same or like reference numerals denote the same or like components even though they are provided in different drawings. Further, in the following description of the present disclosure, a repeated detailed description of the functions and configurations mentioned in this specification and incorporated herein will be omitted.

Embodiment 1

Figure 1:
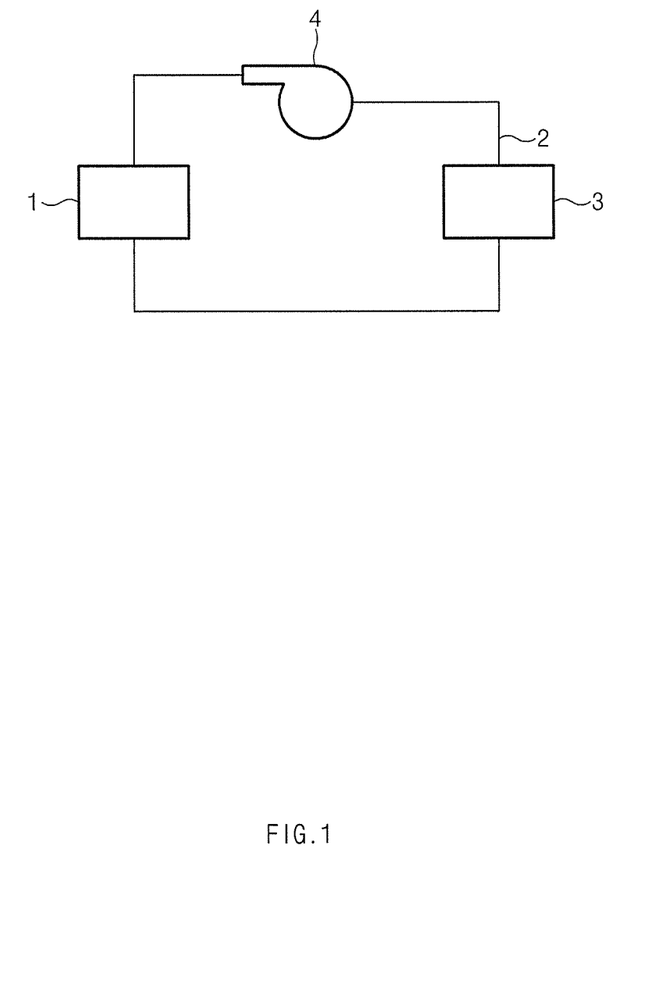
FIG. 1 shows a diagram illustrating a fuel cell system according to a first embodiment of the present disclosure.
Figure 2:
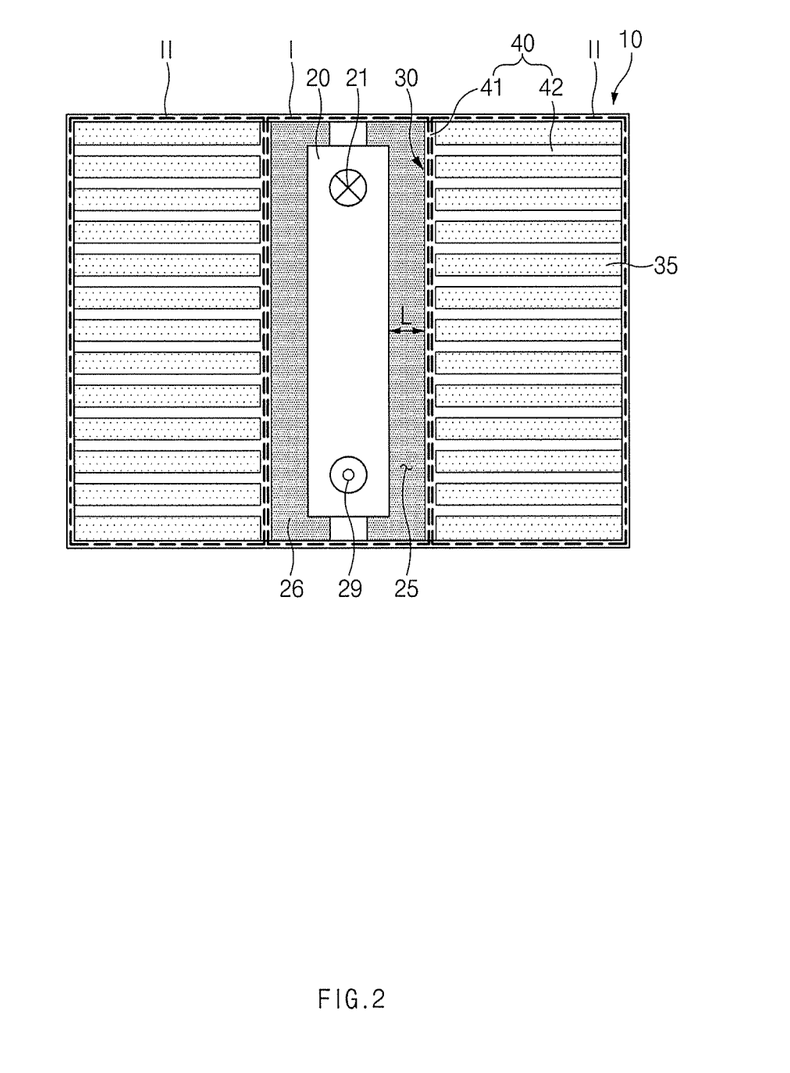
FIG. 2 shows a plan view illustrating a heat exchange apparatus for cooling water of a fuel cell according to the first embodiment of the present disclosure.

FIG. 1 shows a diagram illustrating a fuel cell system according to a first embodiment of the present disclosure. FIG. 2 shows a plan view illustrating a heat exchange apparatus for cooling water of a fuel cell according to the first embodiment of the present disclosure. Hereinafter, the fuel cell system according to the first embodiment of the present disclosure will be described with reference to FIGS. 1 and 2.

The fuel cell system according to the first embodiment of the present disclosure includes a fuel cell stack 1, a cooling water pipe 2, and a heat exchanger 3.

The fuel cell stack 1 includes a fuel electrode (not illustrated) and an air electrode (not illustrated). The cooling water pipe 2 supplies cooling water to the fuel cell stack 1. Then, the cooling water may be suctioned through a pump 4 and may be supplied to the fuel cell stack 1.

The cooling water supplied to the fuel cell stack 1 exchanges heat in the interior of the heat exchanger 3. The cooling water that exchanged heat in the interior of the heat exchanger 3 may be supplied to the fuel cell stack 1 to adjust a temperature of the fuel cell stack.

Hereinafter, the heat exchanger (the heat exchange apparatus for cooling water of a fuel cell) will be described in more detail with reference to FIG. 2.

The heat exchange apparatus for cooling water of a fuel cell includes a body 10, and a heat accumulator 30 provided in the interior of the body 10.

The cooling water pipe 20, through which cooling water flows, passes through the interior of the body 10. An inlet 21 through which cooling water is introduced and an outlet 29 through which cooling water is discharged may be formed in the cooling water pipe 20. The cooling water, which will be supplied to the fuel cell stack 1 in FIG. 1, is introduced into the cooling water pipe 20 through the inlet 21 and is discharged through the outlet 29 after flowing through the cooling water pipe 20.

The heat accumulator 30 is filled with a PCM heat accumulation material 35, and the PCM heat accumulation material 35 exchanges heat with the cooling water flowing through the cooling water pipe 20. Then, the body 10 includes a medium space 25 provided between the heat accumulator 30 and the cooling water pipe 20, and the medium space 25 is filled with a medium material 26. The PCM heat accumulation material 35 exchanges heat with the cooling water by the medium material 26 filled in the medium space 25.

Hereinafter, for convenience of understanding, an area in which the medium space 25 is provided in the interior of the body 10 will be defined as a first area I, and an area in which the heat accumulator 30 is provided will be defined as a second area II.

The heat accumulator 30 may further include a heat transfer member 40 including a first member 41 and a plurality of second members 42. The heat transfer member 40 may transfer the heat received from the cooling water by the medium material 26 to the PCM heat accumulation material 35, or may receive the heat that is to be transferred to the cooling water by the medium material 26, from the PCM heat accumulation material 35.

The first member 41 extends in a lengthwise direction of the cooling water pipe 20 to separate the first area I and the second area II. The plurality of second members 42 may extend from the first member 41 towards a direction that is retrieving away from the cooling water pipe 20, and may be spaced apart from each other in a lengthwise direction of the cooling water pipe 20. The plurality of second members 42 may be spaced apart from each other at the same interval along the lengthwise direction of the cooling water pipe 20 to transfer heat to the PCM heat accumulation material 35 uniformly and as a whole.

The PCM heat accumulation material 35 may be filled in spaces defined by the first member 41 and the second members 42 in the second area II. In this way, as the heat transfer member 40 surrounds at least a portion of the PCM heat accumulation material 35 to efficiently transfer and receive heat to and from the PCM heat accumulation material 35.

The heat transfer member 40 may employ heat dissipating fins having a high thermal conductivity to transfer and receive heat to and from the PCM heat accumulation material 35 more effectively. Then, the PCM heat accumulation material 35 may be seated in the heat accumulator 30 so as not to be separated from the medium space 25.

Then, a heat transfer rate q" between the PCM heat accumulation material 35 and the cooling water may be defined according to the following equation.

$$q'' = kA \frac{T_H - T_L}{L}$$

k denotes a thermal conductivity of the medium material 26 filled in the medium space 25, A denotes a heat transfer area, $T_H$ denotes a temperature of a part of the cooling water pipe 20 and the heat accumulator 30, a temperature of which is relatively high, $T_L$ denotes a temperature of a part of the cooling water pipe 20 and the heat accumulator 30, a temperature of which is relatively low, and L denotes a spacing interval between the cooling water pipe 20 and the heat accumulator 30.

Then, it is assumed that the heat transfer area A and the spacing interval L between the cooling water pipe 20 and the heat accumulator 30 are constant. It is assumed that the cooling water pipe 20 has the same temperature as a whole due to the high thermal conductivity of the interior thereof. It can be seen that the whole heat accumulator 30 has the same temperature due to the heat transfer member 40.

Accordingly, the heat transfer rate q" between the PCM heat accumulation material 35 and the cooling water is proportional to the thermal conductivity k of the medium material 26 filled in the medium space 25 between the heat accumulator 30 and the cooling water pipe 20. The PCM heat accumulation material 35 may employ a material, a phase of which is changed at an operation temperature that is lower than a reference temperature, due to the medium material 26 filling the medium space. The reference temperature refers to a phase change temperature that is necessary for the PCM heat accumulation material 35, when the heat accumulator 30 is located to contact the cooling water pipe 20 such that the medium material 26 is not provided between the heat accumulator 30 and the cooling water pipe 20.

If a heat transfer rate between the PCM heat accumulation material 35 (a phase of which is changed at a reference temperature) and the cooling water when the medium material 26 is not provided between the cooling water pipe 20 and the heat accumulator 30, is approximately the same as a heat transfer rate between the PCM heat accumulation material 35 (a phase of which is changed at an operation temperature that is lower than the reference temperature and which exchanges heat with the cooling water by the medium material 26) and the cooling water, a PCM heat accumulation material 35 (a phase of which is changed at an operation temperature) instead of the PCM heat accumulation material 35 (a phase of which is changed at the reference temperature) may be used by providing the medium material 26 between the heat accumulator 30 and the cooling water pipe 20. Accordingly, a selection range of the PCM heat accumulation material 35 may be widened.

For example, it may be preferable that, when the cooling water flowing at 70° C. is to be cooled to 50° C., the PCM heat accumulation material, a phase of which is changed at 50° C. be located to contact the cooling water pipe 20, through which the cooling water flows. In this way, the phase of the PCM heat accumulation material will be changed at 50° C. while the heat of the cooling water is transferred to the PCM heat accumulation material, and the heat of the cooling water may be sufficiently transferred to the PCM heat accumulation material by using latent heat. Further, the cooling water may be cooled to 50° C. by a thermal equilibrium. Then, 50° C. becomes the reference temperature.

However, the same effect may be obtained by filling the medium material 26 between the heat accumulator 30 filled with the PCM accumulation material 35, a phase of which is changed at an operation temperature of 40° C. that is lower than the reference temperature and the cooling water pipe 20.

Heat transfer rate is higher when the cooling water exchanges heat with the PCM accumulation material 35, a phase of which is changed at 40° C. while the cooling water contacts the PCM accumulation material 35 when the cooling water exchanges heat with the PCM accumulation material, a phase of which is changed at 50° C. However, the PCM heat accumulation material, a phase of which is changed at 50° C., may be replaced by the PCM heat accumulation material 35, a phase of which is changed at 40° C., by providing the medium material 26 between the cooling water pipe 20 and the heat accumulator 30 such that the heat transfer rates of the two cases are approximately the same. That is, when it is not easy to use the PCM heat accumulation material, a phase of which is changed at 50° C. for various reasons, the PCM heat accumulation material 35, a phase of which is changed at 40° C., may be used.

Then, the medium material 26 may be selected based on the heat transfer rate between the heat accumulator 30 filled with the PCM heat accumulation material 35, a phase of which is changed at an operation temperature, and the cooling water pipe 20. If the medium material 26 having a suitable thermal conductivity k is used for filling based on the operation temperature of the selected PCM heat accumulation material 35, the PCM heat accumulation material 35, a phase of which is changed at a desired operation temperature, may be selected.

For example, when the PCM heat accumulation material 35, a phase of which is changed at 30° C., the same effect may be obtained by using a medium material 26 having a low thermal conductivity k as compared with the case in which the PCM heat accumulation material 35, a phase of which is changed at 40° C.

In this way, a selection range of the PCM heat accumulation material 35 may be widened by selecting a PCM heat accumulation material 35, which may be easily used, from PCM heat accumulation materials 35, phases of which are changed at various temperatures, and using the medium material 26 having a suitable thermal conductivity k for filling based on the selected heat accumulation material.

Embodiment 2

Figure 3:
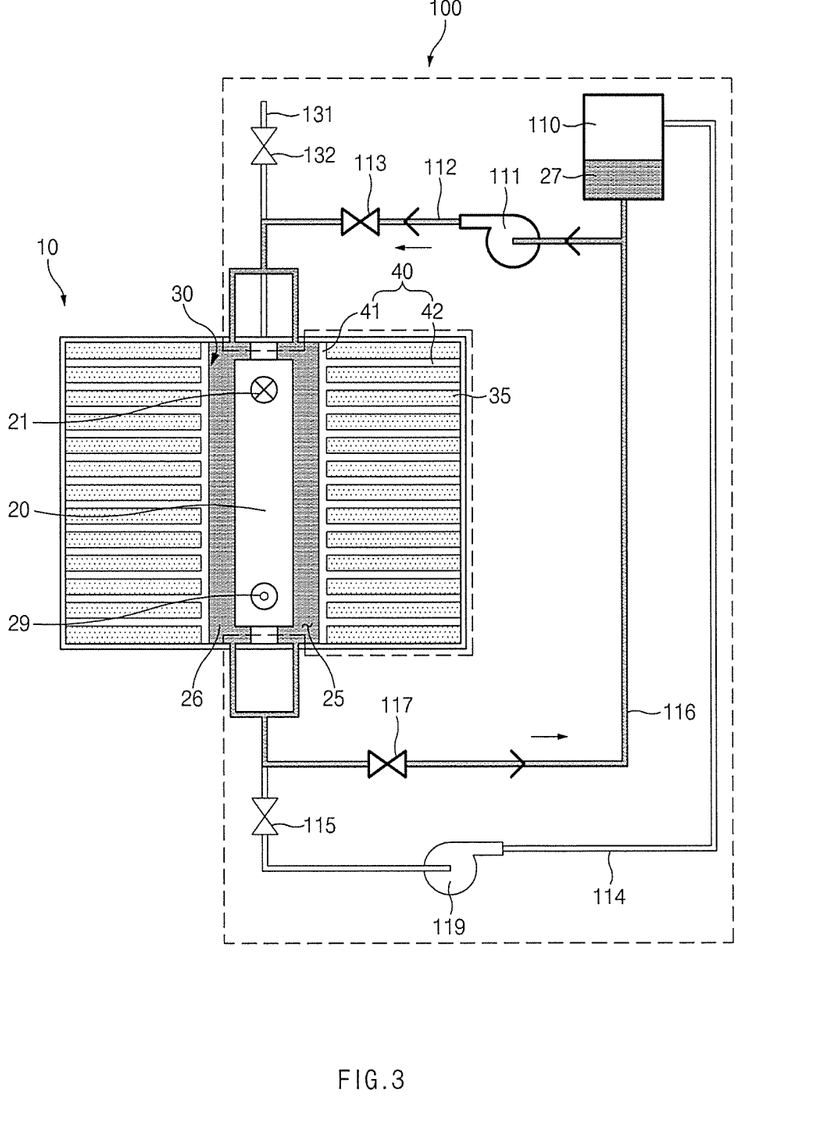
FIG. 3 shows a plan view schematically illustrating a heat exchanger used for a fuel cell system according to a second embodiment of the present disclosure.
Figure 4:
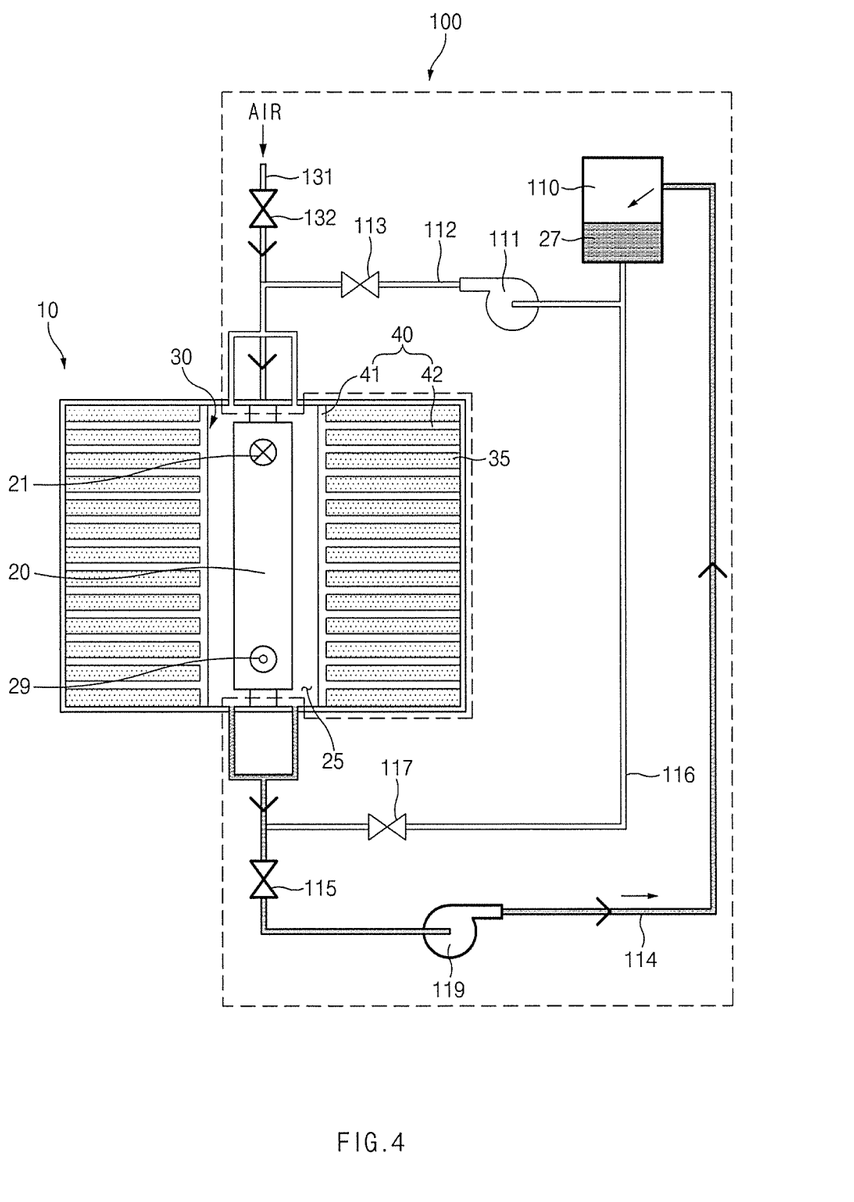
FIG. 4 shows a plan view schematically illustrating a heat exchanger used for a fuel cell system according to a second embodiment of the present disclosure.
Figure 5:
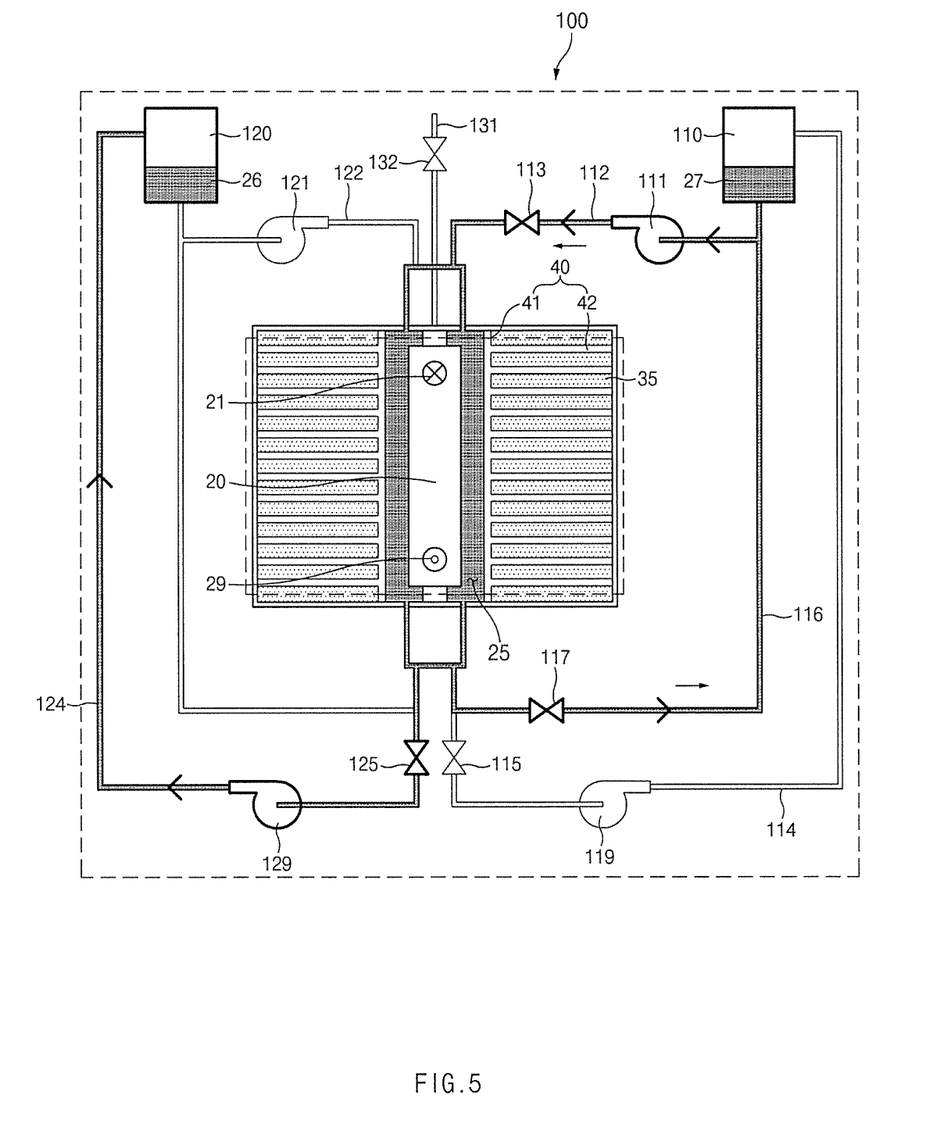
FIG. 5 shows a plan view schematically illustrating a heat exchanger used for a fuel cell system according to a second embodiment of the present disclosure.

FIGS. 3 to 5 are a plan view schematically illustrating a heat exchanger used for a fuel cell system according to a second embodiment of the present disclosure. The heat exchanger (a heat exchange apparatus for cooling water of a fuel cell) according to the second embodiment of the present disclosure is different from that of the first embodiment in that the medium material 26 may be replaced during an operation of the fuel cell.

For example, the thermal conductivity k of gas is lower than the thermal conductivity of liquid, the medium material 26 in a gaseous state may be supplied to the medium space 25 to reduce the heat transfer rate between the cooling water and the PCM heat accumulation material 35. That is, during an operation of the fuel cell, the heat transfer rate between the heat accumulator 30 and the cooling water pipe 20 may be adjusted.

To replace the medium material 26, the heat exchange apparatus may further include a replacement unit 100. The replacement unit 100 may discharge a second medium material 26 filled in the medium space 25 from the medium space 25, and may supply a first medium material 27 to the medium space 25, from which the second medium material 26 has been discharged.

In more detail, the replacement unit 100 may include a first storage tank 110, a first supply pipe 112, a first recovery pipe 114, and a circulation pipe 116. The first medium material 27 is stored in a first storage tank 110, and a first supply pipe 112 is provided separately from the cooling water pipe 20 to supply the first medium material 27 from the first storage tank 110 to the medium space 25.

After being supplied to the medium space 25 by the first supply pipe 112, the first medium material 27 may be discharged from the medium space 25 to be recovered to the first storage tank 110 through a first recovery pipe 114, or may be circulated to the first supply pipe 112 through the circulation pipe 116.

Further, the first supply pipe 112 may be provided with a first supply valve 113 for adjusting opening/closing of the first supply pipe 112, the first recovery pipe 114 may be provided with a first recovery valve 115 for adjusting opening/closing of the first recovery pipe 114, and the circulation pipe 116 may be provided with a circulation valve 117 for adjusting opening/closing of the circulation pipe 116. Further, the first supply pipe 112 may be provided with a first supply pump 111 for suctioning the first medium material 27 from the first storage tank 110, and the first recovery pipe 114 may be provided with a first recovery pump 119 for suctioning the first medium material 27 from the first medium space 25.

Hereinafter, a case in which the second medium material 26 in a gaseous state is discharged from the medium space 25 and the first medium material 27 in a liquid state is supplied to the medium space 25 so that the second medium material 26 is replaced by the first medium material 27 will be described with reference to FIGS. 3 and 4.

For example, a case in which the medium space 25 is filled with air and a portion of the cooling water for cooling the fuel cell stack 1 is used as the first medium material 27 will be described. The replacement unit 100 may include a storage tank (not illustrated) that receives a portion of the cooling water for cooling the fuel cell stack 1 and separately stores the receiving cooling water to use the cooling water as the first medium material 27. If the medium material 26 to be replaced is only the cooling water, the first storage tank 110 may be the storage tank in which the cooling water is stored.

Referring to FIG. 3 first, the replacement unit 100 may supply the first medium material 27 to the medium space 25 as the first supply valve 113 is opened and the first supply pump 111 is operated. The second medium material 26 may be discharged to the outside of the medium space 25 by a pressure at which the first medium material 27 is supplied to the medium space 25. That is, the second medium material 26 may be discharged from the medium space 25 by supplying the first medium material 27.

Further, the replacement unit 100 may circulate the first medium material 27 discharged from the medium space 25 to the first supply pipe 112 through the circulation pipe 116 to sufficiently fill the first medium material 27 in the medium space 25. The circulation valve 117 may be opened and the first medium material 27 may be circulated to the first supply pipe 112 by a suction pressure of the first supply pump 111.

The replacement unit 100 may continuously supply the first medium material 27 through the first supply pipe 112 and circulate the first medium material 27 through the circulation pipe 116 until at least the second medium material 26 is completely discharged. The second medium material 26 may be discharged together with the first medium material 27 to the outside while flowing through the circulation pipe 116 and the first supply pipe 112.

For example, an opened vent hole (not illustrated) may be formed on an upper side of the circulation pipe 116 or the first supply pipe 112, and the second medium material 26 may be discharged to the outside through the vent hole while flowing through the circulation pipe 116 or the first supply pipe 112.

The replacement unit 100 may supply and circulate the first medium material 27 until the first medium material 27 is sufficiently filled in the medium space 25, even after the second medium material 26 is completely discharged to the outside.

Through the process, the second medium material 26 in a gaseous state may be completely discharged from the medium space 25, and the first medium material 27 in a liquid state may be filled in the medium space 25, from which the second medium material 26 has been discharged.

Next, a process of discharging the first medium material 27 from the medium space 25, and filling air in the medium space 25 will be described.

Referring to FIG. 4, the first medium material 27 may be recovered to the first storage tank 110 through the first recovery pipe 114. Then, the first recovery valve 115 may be opened and the first recovery pump 119 may be operated.

The replacement unit 100 may further include a ventilation pipe 131 that communicates the medium space 25 with the outside of the body 10. The ventilation pipe 131 is a separate configuration from the first supply pipe 112. The ventilation pipe 131 may be provided with a ventilation valve 132 for opening and closing the ventilation pipe 131. When the first medium material 27 is recovered from the medium space 25 to the first storage tank 110 through the first recovery pipe 114, the ventilation valve 132 may be opened and the ventilation pipe 131 may provide a passage, through which exterior air is introduced into the medium space 25.

When the first medium material 27 is recovered through the first recovery pipe 114, the pressure in the medium space 25 may be changed, and the air outside the body 10 may be introduced into the medium space 25 through the ventilation pipe 131 by the change of the pressure of the medium space 25.

Further, when the first medium material 27 is recovered to the first storage tank 110, the pressure of the medium space 25 may be lowered by an operation of the first recovery pump 119 so that the body 10 may be crushed, and then because the exterior air may be introduced into the medium space 25 due to the ventilation pipe 131, damage to the body 10 also may be prevented.

Through the process, the medium material in the medium space 25 may be replaced by discharging the first medium material 27 from the medium space 25 and supplying air again.

Hereinafter, a case in which the second medium material 26 in a liquid state is discharged from the medium space 25 and the first medium material 27 in a liquid state is supplied to the medium space 25 so that the second medium material 26 is replaced by the first medium material 27 will be exemplified with reference to FIG. 5.

When the second medium material 26 is in a gaseous state, the second medium material 26 may be discharged to the outside of the medium space 25 by a pressure at which the first medium material 27 in a liquid state is supplied. However, because the first medium material 27 and the second medium material 26 may be mixed with each other due to the supply of the first medium material 27 when the second medium material 26 is in a liquid state, it is necessary to supply the first medium material 27 after recovering the second medium material 26 first.

To achieve this, the replacement unit 100 may further include a second storage tank 120, a second supply pipe 122, and a second recovery pipe 124. Although it is not necessary to use the second supply pipe 122 to discharge the second medium material 26 and supply the first medium material 27, the second supply pipe 122, the second supply valve 123, and the second supply pump 121 also may be provided against an opposite case.

The second recovery pipe 124 may be provided with a second recovery valve 125 for adjusting opening/closing of the second recovery pipe 124. Further, the second recovery pipe 124 may be provided with a second recovery pump 129 for suctioning the second medium material 26 from the second medium space 25.

First, the replacement unit 100 may recover the second medium material 26 to the second storage tank 120 through the second recovery pipe 124. If the second recovery valve 125 is opened and the second recovery pump 129 is operated, the replacement unit 100 may recover the second medium material 26 to the second storage tank 120 through the second recovery pipe 124.

Even then, similarly, the exterior air may be filled in the medium space 25 through the ventilation pipe 131. That is, when the second medium material 26 is recovered to the second storage tank 120, exterior air is filled in the medium space 25 through the ventilation pipe 131.

If the first medium material 27 is supplied to the medium space 25 through the first supply pipe 112 after the second medium material 26 is discharged from the medium space 25, the second medium material 26 may be replaced by the first medium material 27. When the first medium material 27 is supplied, the air of the medium space 25 is discharged to the outside.

Through the process, the second medium material 26 in a liquid state may be discharged from the medium space 25, and the first medium material 27 in another liquid state may be filled in the medium space 25.

Meanwhile, the fuel cell system may further include a control unit (not illustrated) that controls the replacement unit 100. The control unit may adjust a temperature of the cooling water discharged from the heat exchanger 3 through adjustment of the heat transfer rate by the control of the replacement unit 100.

In more detail, the control unit may control the replacement unit 100 based on a moisture situation in the fuel cell stack 1. It is preferable that a suitable amount of moisture be present in the fuel electrode and the air electrode of the fuel cell stack 1.

Because the electrolyte membrane of the fuel cell has an ionic conductivity only in a state in which the electrolyte is sufficiently hydrated, electricity may not be generated if moisture is insufficient. However, if an excessive amount of moisture is present, a flooding phenomenon in which the moisture in the fuel cell stack 1 is not discharged to the outside to hamper flowing of the fuel and oxygen may be generated.

Accordingly, the control unit may adjust the temperature of the cooling water supplied to the fuel cell stack 1 based on a moisture situation in the fuel cell stack 1 so that the fuel cell stack 1 may contain a suitable amount of moisture therein.

If the moisture situation in the fuel cell stack 1 is determined to be a low moisture situation, the replacement unit 100 may be controlled such that a medium material having a high thermal conductivity k may be filled in the first and second medium materials. Evaporation of moisture may be prevented by supplying the cooling water of a low temperature to the fuel cell stack 1.

If the moisture situation in the fuel cell stack 1 is determined to be a high moisture situation, the replacement unit 100 may be controlled such that a medium material having a low thermal conductivity k may be filled in the first and second medium materials. Evaporation of moisture may be expedited by supplying the cooling water of a high temperature to the fuel cell stack 1.

In this way, because the cooling water having a suitable temperature may be supplied based on the situation of the fuel cell stack 1 during an operation of the fuel cell, the thermal efficiency of the fuel cell system may be increased.

Further, the control unit may adjust a period of time, for which the PCM heat accumulation material 35 in a liquid state is coagulated through adjustment of the heat transfer rate by a control of the replacement unit 100. For example, the PCM heat accumulation material 35 that is in a solid state at a room temperature receives heat to be solved in a liquid state, and when the PCM heat accumulation material 35 is coagulated in a short period of time, much heat may be transferred from the PCM heat accumulation material 35 to the cooling water by filling the medium material having a high thermal conductivity in the medium space 25.

According to the present disclosure, a PCM, a phase of which is changed at a desired temperature, may be used as a heat accumulation material, by filling a medium material between the heat accumulator filled with a PCM and the cooling pipe, through which the cooling water flows.

Further, according to the present disclosure, the temperature of the cooling water supplied to the fuel cell stack may be easily adjusted by changing the medium material between the heat accumulator and the cooling pipe.

The above description is a simple exemplification of the technical spirit of the present disclosure, and the present disclosure may be variously corrected and modified by those skilled in the art to which the present disclosure pertains without departing from the essential features of the present disclosure. Therefore, the disclosed embodiments of the present disclosure do not limit the technical spirit of the present disclosure but are illustrative, and the scope of the technical spirit of the present disclosure is not limited by the embodiments of the present disclosure. The scope of the present disclosure should be construed by the claims, and it will be understood that all the technical spirits within the equivalent range fall within the scope of the present disclosure.

What is claimed is:

1. A heat exchange apparatus for cooling water of a fuel cell, the heat exchange apparatus comprising:
   a body including a cooling water pipe passing therethrough and a medium space including any one of a first medium material or a second medium material therein, wherein cooling water that is to be supplied to a fuel cell stack flows through the cooling water pipe, and wherein the second medium material has a thermal conductivity different from a thermal conductivity of the first medium material;
   a heat accumulator arranged in an interior of the body and including therein a PCM heat accumulation material that is to exchange heat with the cooling water; and
   a replacement unit including a first storage tank configured to store the first medium material and configured to discharge the second medium material filled in the medium space from the medium space, and to supply the first medium material of the first storage tank to the medium space from which the second medium material has been discharged,
   wherein the medium space is arranged to surround the cooling water pipe between the cooling water pipe and the heat accumulator so that the PCM heat accumulation material exchanges heat with the cooling water by the first medium material or the second medium material filled in the medium space,
   wherein a phase of the PCM heat accumulation material is changed at a predetermined operation temperature that is lower than a reference temperature to which the cooling water to be discharged from the body is cooled during cooling of the cooling water by the PCM heat accumulation material, and
   wherein the replacement unit further includes:
   a first supply pipe arranged separately from the cooling water pipe and configured to supply the first medium material from the first storage tank to the medium space; and
   a first recovery pipe configured to recover the first medium material discharged from the medium space to the first storage tank.

2. The heat exchange apparatus of claim 1, wherein the replacement unit discharges the second medium material, which is air, from the medium space by supplying the first medium material.

3. The heat exchange apparatus of claim 2, wherein the replacement unit further includes:
   a circulation pipe configured to circulate the first medium material discharged from the medium space to the first supply pipe,
   wherein the first medium material continues to be supplied to the first supply pipe and be circulated through the circulation pipe until at least the second medium material is completely discharged, and
   wherein the second medium material is discharged to the outside while flowing through the circulation pipe or the first supply pipe, together with the first medium material.

4. The heat exchange apparatus of claim 2, wherein the replacement unit further includes:
   a ventilation pipe configured to communicate the medium space and the outside of the body, and
   wherein air outside the body is introduced into the medium space through the ventilation pipe due to a change of a pressure in the medium space, which occurs when the first medium material is recovered from the medium space to the first storage tank through the first recovery pipe.

5. The heat exchange apparatus of claim 1, wherein the replacement unit further includes:
   a second storage tank configured to store the second medium material;
   a second supply pipe arranged separately from the cooling water pipe and configured to supply the second medium material from the second storage tank to the medium space; and
   a second recovery pipe configured to recover the second medium material discharged from the medium space to the second storage tank.

6. The heat exchange apparatus of claim 5, wherein the replacement unit supplies the first medium material to the medium space through the first supply pipe after recovering the second medium material from the medium space to the second storage tank through the second recovery pipe.

7. A fuel cell system comprising:
a fuel cell stack;
a cooling water pipe configured to supply cooling water to the fuel cell stack; and
a heat exchanger configured to exchange heat with the cooling water to be supplied to the fuel cell stack,
wherein the heat exchanger includes:
   a body, through which the cooling water pipe passes, wherein the body has a medium space including any one of a first medium material or a second medium material therein, and wherein the second medium material has a thermal conductivity different from a thermal conductivity of the first medium material;
   a heat accumulator arranged in an interior of the body and including therein a PCM heat accumulation material that is to exchange heat with the cooling water; and
   a replacement unit including a first storage tank configured to store the first medium material and configured to discharge the second medium material filled in the medium space from the medium space, and to supply the first medium material of the first storage tank to the medium space from which the second medium material has been discharged,
wherein the PCM heat accumulation material exchanges heat with the cooling water by the first medium material or the second medium material filled in the medium space,
wherein a phase of the PCM heat accumulation material is changed at a predetermined operation temperature that is lower than a reference temperature to which the cooling water to be discharged from the body is cooled during cooling of the cooling water by the PCM heat accumulation material, and
wherein the replacement unit further includes:
   a first supply pipe arranged separately from the cooling water pipe and configured to supply the first medium material from the first storage tank to the medium space; and
   a first recovery pipe configured to recover the first medium material discharged from the medium space to the first storage tank.

8. The fuel cell system of claim 7, further comprising a control unit configured to control the replacement unit to adjust a heat transfer rate between the heat accumulator and the cooling water pipe.

9. The fuel cell system of claim 8, wherein the control unit adjusts the temperature of the cooling water discharged from the heat exchanger through adjustment of the heat transfer rate by the control of the replacement unit.

10. The fuel cell system of claim 9, wherein the control unit controls the replacement unit, based on a moisture situation in the fuel cell stack.

11. The fuel cell system of claim 10, wherein the control unit controls the replacement unit such that, among the first and second medium materials, a medium material having a higher thermal conductivity is filled in the medium space if the moisture situation is determined to be a low moisture situation, and a medium material having a lower thermal conductivity is filled in the medium space if the moisture situation is determined to be a high moisture situation.

12. The fuel cell system of claim 8, wherein the control unit adjusts a period of time, for which the PCM accumulation material in a liquid state is coagulated, through adjustment of the heat transfer rate by the control of the replacement unit.

13. The fuel cell system of claim 8, wherein the first storage tank is further configured to receive a portion of cooling water for cooling the fuel cell stack and separately store the received cooling water so that the cooling water is used as the first medium material.

* * * * *